June 10, 1924.

H. A. MARCOTT

DIRIGIBLE TOWING BAR ATTACHMENT

Filed June 7, 1923

1,496,993

Inventor
H. A. Marcott
by Hazard & Miller
Attys

Patented June 10, 1924.

1,496,993

UNITED STATES PATENT OFFICE.

HALLEY A. MARCOTT, OF EAGLE ROCK, CALIFORNIA.

DIRIGIBLE TOWING-BAR ATTACHMENT.

Application filed June 7, 1923. Serial No. 643,922.

*To all whom it may concern:*

Be it known that I, HALLEY A. MARCOTT, a citizen of the United States, residing at Eagle Rock city, in the county of Los Angeles and State of California, have invented new and useful Improvements in Dirigible Towing-Bar Attachments, of which the following is a specification.

My invention relates to and has for its purpose the provision of an attachment for motor vehicles of extremely simple, inexpensive, and durable construction, by means of which the dirigible towing of a vehicle can be readily effected.

It is also a purpose of my invention to provide a diribible towing attachment which includes a special form of bumper that normally occupies a protecting position with respect to the front of the vehicle, and which is adapted to be connected to the operating arm of the towing attachment when the vehicle is being towed so as to function as a draft bar for operatively connecting the towed vehicle with the towing vehicle.

Although I have herein shown and will describe only one form of dirigible towing attachment embodying my invention, it is to be understood that various changes and modifications may be made herein without departing from the spirit of the invention and the spirit and scope of the appended claims.

In the accompanying drawings.

Figure 2:
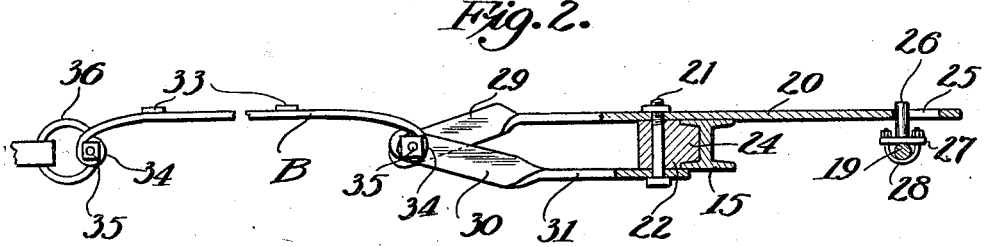
Fig. 2 is a vertical sectional view taken on the line 2—2 Fig. 1.

Referring specifically to the drawings in which similar reference characters refer to similar parts, my invention in its present embodiment is shown as applied to a motor vehicle including a front axle 15, front wheels 16, the usual spindle arms 17 mounted to swing about the bolts 18 as a center and operatively connected to each other by means of a tie rod 19. The attachment forming the subject matter of my invention comprises in the present instance an operating arm 20, fulcrumed on a bolt 21 extending through block 22 which is secured to the front axle 15 by U bolts 23. The block 22 is shaped to receive and prevent displacement of the bolts 23, and is also formed with a projection 24 which fits within the front side of the axle 15, as clearly shown in Fig. 2. The rear end of the arm 20 is provided with a slot 25 in which works a pin 26 formed on or secured to a plate 27, the latter being secured to the medial portion of the tie rod 19 by means of U bolts 28. The forward end of the arm 20 is twisted at right angles and bent to provide a downwardly inclined extension 29 which is adapted to be connected to an upwardly inclined extension 30 formed on the forward end of a brace bar 31. The bar 31 is likewise pivoted upon the bolt 21 but at the lower side of the block 22, as clearly shown in Fig. 2.

From the foregoing arrangement, it would be clear that the operating arm 20 is operatively connected to the tie rod 19 of the steering mechanism of the wheels 16, and that by movement of the arm about its pivot 21, a longitudinal movement of the tie rod 19 is effected to operate the spindle arms 17 and causing a steering of the front wheels 16.

Figure 1:
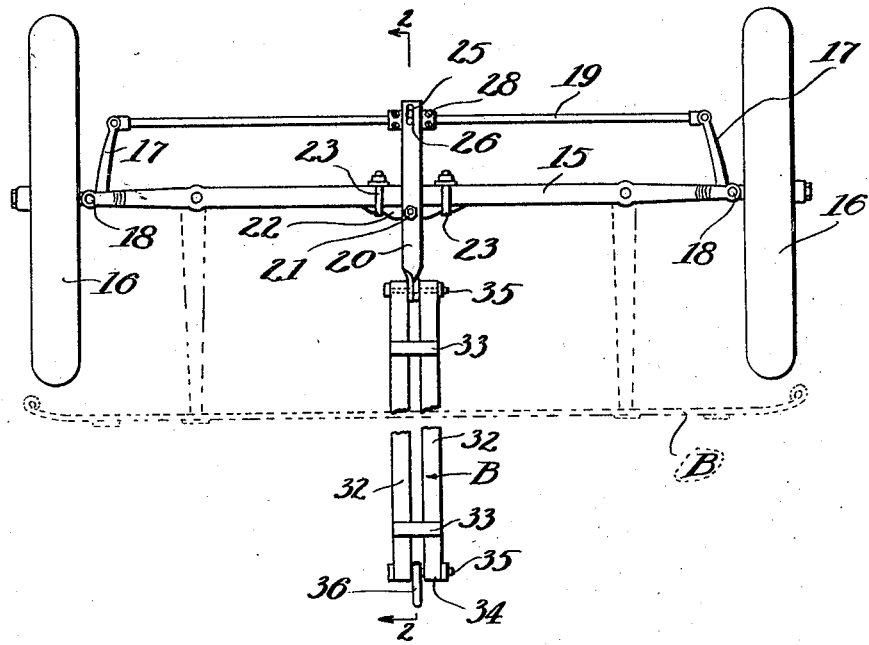
Fig. 1 is a view showing in top plan the front end of a motor vehicle having applied to the steering mechanism thereof one form of towing attachment embodying my invention.

A bumper indicated generally at B normally occupies a protecting position with respect to the front of the vehicle as indicated in dash lines in Fig. 1. This bumper comprises in the present instance a pair of bars 32 secured in spaced relation by cross bars 33 and having their ends curved upon themselves to provide sleeves 34 which receive bolts 35. The bumper is adapted to be normally supported in protecting position in such manner that it can be readily detached so as to be associated with the operating arm 20 and brace bar 31. The extensions 29 and 30 are formed with registering openings through which one of the bolts 35 is adapted to extend, while the other bolt 35 is adapted to receive a ring 36 or other suitable element to permit of its connection to a towing vehicle. It will be noted that the extensions 29 and 30 are arranged between the bars 32 so that any lateral movement of the bumper effects a rocking of the operating arm 20 about pivot 21 as a center.

In practice, the bumper B is connected to the towing vehicle in any suitable manner such as by a rope (not shown) extended through the ring 36. Thus, when the towing vehicle deviates from a straight course, the bumper B will be moved laterally to effect a corresponding movement of the wheel 16 through the operating arm 20 and the tie rod 19. It will be understood that the pin and slot connection between the tie rod and operating arm allows of unrestricted lateral movement of the tie rod so as to prevent any binding between the two elements.

What I claim is:

1. In combination, a motor vehicle including a front axle, spindle arms, and a tie rod, means supported on said axle and operatively connected to said tie rod for effecting an actuation of the latter, and a bumper detachably supported on the vehicle and having eyes at its ends and adapted to be removed from the vehicle connected to said means by a bolt through one eye and through said means in the manner and for the purpose described.

2. A dirigible towing attachment for motor vehicles, comprising a supporting block, means adapted to secure the block to the front axle of a motor vehicle, an arm fulcrumed on the block and having one end formed with a slot, the other end of the arm being bent and twisted to provide a downwardly inclined extension, a plate adapted to be secured to the tie rod of the motor vehicle, a pin carried by said plate and working in said slot, and a brace bar pivoted on the block and having an upwardly inclined extension connected to the extension of said arm.

3. A dirigible towing attachment for motor vehicles, comprising a supporting block, means adapted to secure the block to the front axle of a motor vehicle, an arm fulcrumed on the block and having one end formed with a slot, the other end of the arm being bent and twisted to provide a downwardly inclined extension, a plate adapted to be secured to the tie rod of the motor vehicle, a pin carried by said plate and working in said slot, a brace bar pivoted on the block and having an upwardly inclined extension connected to the extension of said arm, and a bumper including spaced bars bent to provide sleeves at the ends of the bars, and bolts extending through said sleeves, one of said bolts engaging said extensions so as to support the latter between the bars.

4. A dirigible towing attachment for motor vehicles, comprising a supporting block, means adapted to secure the block to the front axle of a motor vehicle, an arm fulcrumed on the block and having one end formed with a slot, the other end of the arm being bent and twisted to provide a downwardly inclined extension, a plate adapted to be secured to the tie rod of the motor vehicle, a pin carried by said plate and working in said slot, a brace bar pivoted on the block and having an upwardly inclined extension connected to the extension of said arm, and means forming a draw bar hingedly connected to said extensions.

In testimony whereof I have signed my name to this specification.

HALLEY A. MARCOTT.